(12) United States Patent
Fukuhara

(10) Patent No.: US 9,360,118 B2
(45) Date of Patent: Jun. 7, 2016

(54) MAGNETIC FLUID SEAL

(75) Inventor: Takuto Fukuhara, Tokyo (JP)

(73) Assignee: Eagle Industry Co., Ltd., Minato-Ku (JP)

( * ) Notice: Subject to any disclaimer, the term of this patent is extended or adjusted under 35 U.S.C. 154(b) by 0 days.

(21) Appl. No.: 13/819,892

(22) PCT Filed: Jan. 16, 2012

(86) PCT No.: PCT/JP2012/050697
§ 371 (c)(1),
(2), (4) Date: Feb. 28, 2013

(87) PCT Pub. No.: WO2012/105301
PCT Pub. Date: Aug. 9, 2012

(65) Prior Publication Data
US 2013/0161910 A1   Jun. 27, 2013

(30) Foreign Application Priority Data

Feb. 3, 2011 (JP) ................................. 2011-021663

(51) Int. Cl.
*F16J 15/43* (2006.01)
(52) U.S. Cl.
CPC ...................................... *F16J 15/43* (2013.01)
(58) Field of Classification Search
USPC ................................................ 277/410, 433
See application file for complete search history.

(56) References Cited

U.S. PATENT DOCUMENTS

| | | | | |
|---|---|---|---|---|
| 2,587,077 | A * | 2/1952 | Winther | 277/347 |
| 2,883,212 | A * | 4/1959 | Laser | 277/419 |
| 3,848,879 | A * | 11/1974 | Hudgins | 277/347 |
| 4,054,293 | A * | 10/1977 | Hoeg et al. | 277/410 |
| 4,171,818 | A * | 10/1979 | Moskowitz et al. | 277/410 |
| 4,200,296 | A * | 4/1980 | Stahl et al. | 277/302 |
| 4,304,411 | A * | 12/1981 | Wilcock et al. | 277/427 |
| 4,309,632 | A * | 1/1982 | Muller et al. | 310/52 |
| 4,335,885 | A * | 6/1982 | Heshmat | 277/347 |

(Continued)

FOREIGN PATENT DOCUMENTS

| | | |
|---|---|---|
| GB | 2 302 921 A | 2/1997 |
| JP | 56-050859 U | 5/1981 |

(Continued)

OTHER PUBLICATIONS

Korean Office Action (Application No. 10-2013-7009119) dated Mar. 21, 2014.

(Continued)

*Primary Examiner* — Vishal Patel
*Assistant Examiner* — L. Susmitha Koneru
(74) *Attorney, Agent, or Firm* — Burr & Brown, PLLC

(57) ABSTRACT

A magnetic fluid seal is provided, capable of producing a stable scaling performance by stably holding magnetic fluid in place between two members, even in cases when the two members become eccentric. The magnetic fluid seal includes: an annular magnetic circuit forming member that is disposed on a housing; an annular member that is disposed on a shaft; and a magnetic fluid that is magnetically held between axially opposing surfaces of the magnetic circuit forming member and the annular member. In addition, the annular member comprises a flexible member that is swayable so that a portion of the annular member that opposes the magnetic circuit forming member follows the magnetic circuit forming member.

14 Claims, 10 Drawing Sheets

(56) References Cited

U.S. PATENT DOCUMENTS

| | | | | |
|---|---|---|---|---|
| 4,444,398 | A * | 4/1984 | Black et al. | 277/302 |
| 4,486,026 | A * | 12/1984 | Furumura et al. | 277/400 |
| 4,557,490 | A * | 12/1985 | Tavares | 277/347 |
| 4,575,103 | A * | 3/1986 | Pedu | 277/410 |
| 4,598,914 | A * | 7/1986 | Furumura et al. | 277/410 |
| 4,671,679 | A * | 6/1987 | Heshmat | 384/133 |
| 4,734,606 | A * | 3/1988 | Hajec | 310/90.5 |
| 4,827,168 | A * | 5/1989 | Nakajima | 310/90 |
| 4,890,940 | A * | 1/1990 | Schmidt et al. | 384/446 |
| 4,995,622 | A * | 2/1991 | Fuse | 277/410 |
| 5,009,436 | A * | 4/1991 | Endo et al. | 277/347 |
| 5,011,165 | A * | 4/1991 | Cap | 277/347 |
| 5,035,436 | A * | 7/1991 | Rockwood et al. | 277/431 |
| 5,118,118 | A * | 6/1992 | Tadic et al. | 277/351 |
| 5,137,286 | A * | 8/1992 | Whitford | 277/410 |
| 5,152,539 | A * | 10/1992 | Takii et al. | 277/347 |
| 5,161,902 | A * | 11/1992 | Fujii | 277/410 |
| 5,238,254 | A * | 8/1993 | Takii et al. | 277/347 |
| 5,267,737 | A * | 12/1993 | Cossette et al. | 277/410 |
| 5,536,020 | A * | 7/1996 | Matsumoto et al. | 277/410 |
| 5,676,472 | A * | 10/1997 | Solomon et al. | 384/607 |
| 5,794,487 | A * | 8/1998 | Solomon et al. | 74/490.03 |
| 5,954,342 | A * | 9/1999 | Mikhalev et al. | 277/410 |
| 6,029,978 | A * | 2/2000 | Pelstring et al. | 277/410 |
| 6,142,477 | A * | 11/2000 | Meinzer | 277/378 |
| 6,199,867 | B1 * | 3/2001 | Mahoney et al. | 277/410 |
| 6,220,602 | B1 * | 4/2001 | Webster et al. | 277/410 |
| 6,247,701 | B1 * | 6/2001 | Kitada et al. | 277/410 |
| 6,290,233 | B1 * | 9/2001 | Yamamura et al. | 277/410 |
| 6,378,874 | B1 * | 4/2002 | Dorulla | 277/410 |
| 6,464,230 | B1 * | 10/2002 | Tong et al. | 277/355 |
| 6,558,042 | B1 | 5/2003 | Tompkins | 384/133 |
| 6,739,594 | B2 * | 5/2004 | Beeck et al. | 277/433 |
| 6,746,019 | B1 * | 6/2004 | Liebenberg et al. | 277/410 |
| 6,910,857 | B2 * | 6/2005 | Addis | 415/174.2 |
| 6,976,682 | B1 | 12/2005 | Macleod et al. | |
| 7,249,769 | B2 * | 7/2007 | Webster | 277/411 |
| 7,950,672 | B2 * | 5/2011 | Shimazaki et al. | 277/410 |
| 8,047,549 | B2 * | 11/2011 | Kung | 277/410 |
| 8,136,995 | B2 * | 3/2012 | Otsuka et al. | 384/477 |
| 8,191,900 | B2 * | 6/2012 | Suzuki et al. | 277/433 |
| 8,256,575 | B2 * | 9/2012 | Berberich | 184/6.11 |
| 8,430,409 | B2 * | 4/2013 | Mahoney et al. | 277/410 |
| 2003/0141667 | A1 * | 7/2003 | Emoto et al. | 277/410 |
| 2004/0222595 | A1 * | 11/2004 | Gueldry et al. | 277/410 |
| 2004/0227299 | A1 * | 11/2004 | Simmons | 277/410 |
| 2005/0013041 | A1 | 1/2005 | Macleod et al. | |
| 2005/0127765 | A1 * | 6/2005 | Kummeth | 310/90.5 |
| 2007/0029737 | A1 * | 2/2007 | Mikhalev et al. | 277/410 |
| 2007/0138747 | A1 * | 6/2007 | Ratzmann et al. | 277/302 |
| 2009/0115137 | A1 * | 5/2009 | Shimazaki et al. | 277/410 |
| 2009/0127794 | A1 * | 5/2009 | Mahoney et al. | 277/410 |
| 2010/0025935 | A1 * | 2/2010 | Helgeland | 277/410 |
| 2010/0171271 | A1 * | 7/2010 | Kung | 277/410 |
| 2010/0322663 | A1 * | 12/2010 | Kofferlein et al. | 399/104 |
| 2011/0062671 | A1 * | 3/2011 | Garcia-Crespo et al. | 277/410 |
| 2011/0193292 | A1 * | 8/2011 | Li et al. | 277/410 |
| 2011/0215533 | A1 * | 9/2011 | Li et al. | 277/410 |
| 2012/0018958 | A1 * | 1/2012 | Kung | 277/410 |

FOREIGN PATENT DOCUMENTS

| | | |
|---|---|---|
| JP | 58-099558 U | 7/1983 |
| JP | 63-047568 A1 | 2/1988 |
| JP | 64-083976 A1 | 3/1989 |
| JP | 02-240461 A1 | 9/1990 |
| JP | 05-036125 U | 5/1993 |
| JP | 06-071969 U | 10/1994 |
| JP | 07-111026 A1 | 4/1995 |
| JP | 2002-349718 A1 | 12/2002 |
| JP | 2003-254445 A1 | 9/2003 |
| JP | 2003-526761 A1 | 9/2003 |
| JP | 2003-336749 A1 | 11/2003 |
| JP | 2010-058254 A1 | 3/2010 |

OTHER PUBLICATIONS

International Search Report dated Mar. 19, 2012 (with English Translation).

* cited by examiner

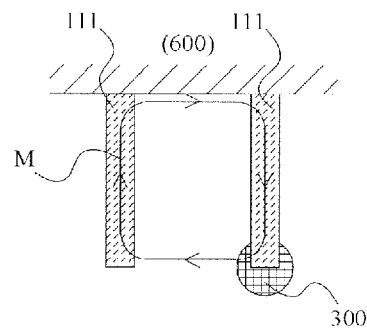
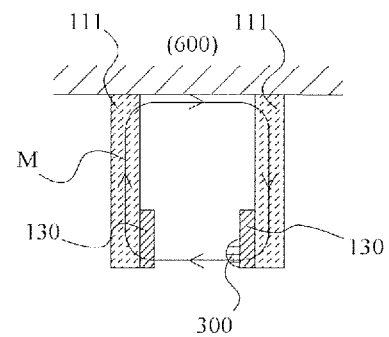
Fig. 3A    Fig. 3B
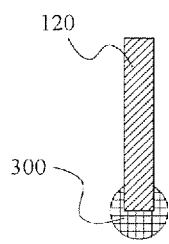
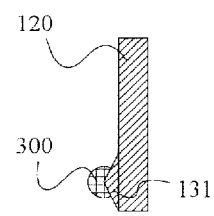
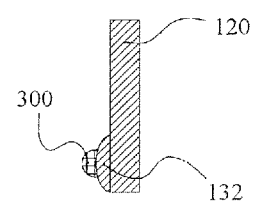
Fig. 3C    Fig. 3D    Fig. 3E
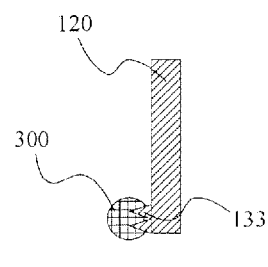
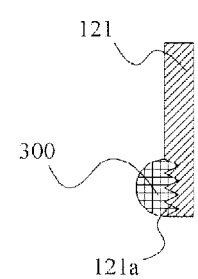
Fig. 3F    Fig. 3G

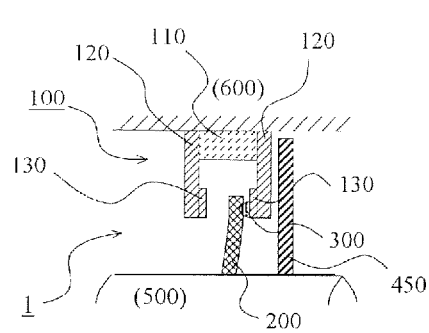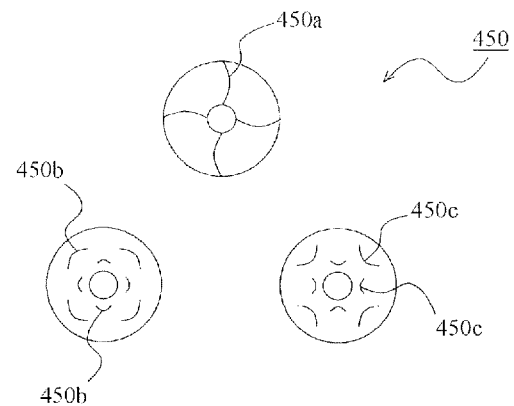
Fig. 7A
Fig. 7B
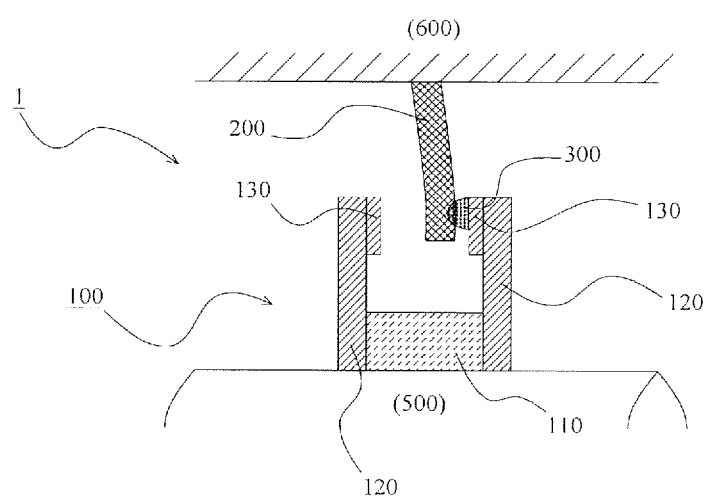
Fig. 8

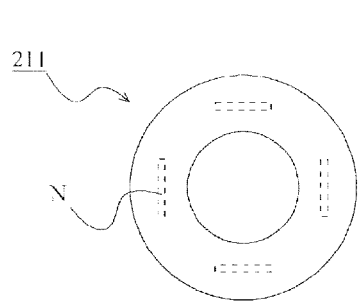
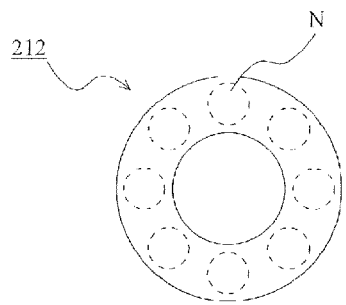
Fig. 11A  Fig. 11B
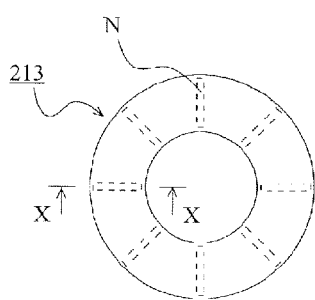
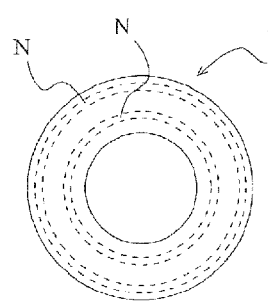
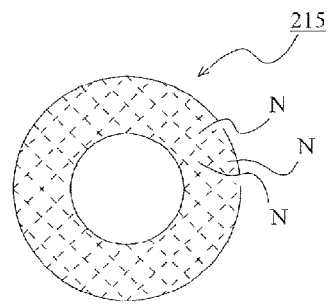
Fig. 11C  Fig. 11D  Fig. 11E
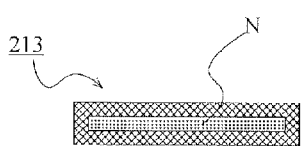
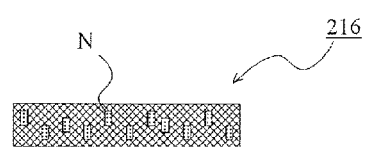
Fig. 11F  Fig. 11G

MAGNETIC FLUID SEAL

BACKGROUND OF THE INVENTION

1. Field of the Invention

The present invention relates to a magnetic fluid seal to seal an annular gap between two members rotating relative to each other.

2. Description of Related Art

In the past, magnetic fluid seals have been known, which seal an annular gap between two members that rotate relative to each other. As for a magnetic fluid seal, there is an advantage in that friction torque can be extremely decreased, in comparison with a seal composed of a rubber, a resin, or the like. Meanwhile, in the case of a magnetic fluid seal, there is a disadvantage in that a structure for stably holding a magnetic fluid in place between two members rotating relative to each other is difficult in comparison with a solid material such as a rubber, a resin, or the like.

In order to stably hold a magnetic fluid in place, there is a need to stably form a magnetic circuit and to decrease the variation in a region (space) where a magnetic fluid is held. Accordingly, in cases when the two relatively rotating members become eccentric to each other, it has been difficult to stably hold the magnetic fluid in place.

CITATION LIST

Patent Literature

Patent Literature 1: Japanese Patent Application Laid-Open (JP-A) No. 2010-058254
Patent Literature 2: JP-A No. 2003-254445
Patent Literature 3: JP-A No. 2002-349718
Patent Literature 4: JP-A No. 07-111026
Patent Literature 5: Japanese Utility Model Application Laid-Open (JP-U) No. 06-071969

SUMMARY OF INVENTION

Technical Problem

An object of the present invention is to provide a magnetic fluid seal that is capable of producing a stable sealing performance by stably holding the magnetic fluid in place, even in cases when the two members become eccentric.

Solution to Problem

The present invention has employed the following means, in order to solve the above problem.

Specifically, a magnetic fluid seal of the present invention to seal an annular gap between two members rotating relative to each other, comprises: an annular magnetic circuit forming member being disposed on one of the two members; an annular member being disposed on the other of the two members; and a magnetic fluid being magnetically held between axially opposing surfaces of the magnetic circuit forming member and the annular member, wherein the annular member comprises a flexible member being swayable so that a portion of the annular member opposing the magnetic circuit forming member follows the magnetic circuit forming member.

According to the present invention, the magnetic fluid is magnetically held between the axially opposing surfaces of the magnetic circuit forming member and the annular member. In addition, the portion of the annular member opposing the magnetic circuit forming member follows the magnetic circuit forming member.

Accordingly, even when the interval of the annular gap between the two members is varied due to the eccentricity of the two members or the like, or even when the two members move relatively in the axial direction, the distance between the opposing surfaces where the magnetic fluid is magnetically held can be kept constant. Therefore, the magnetic fluid is stably held in place (magnetically held).

It is preferable that at least a portion of the annular member which is in contact with the magnetic fluid has a structure that is capable of absorbing and retaining the magnetic fluid therein.

In doing so, the magnetic fluid can be held in place more reliably and be supplied between the opposing surfaces even when the amount of the magnetic fluid is decreased due to the dispersion or the like. Furthermore, even when the material itself of the annular member is a non-magnetic material, the portion thereof which absorbs and retains the magnetic fluid performs an equivalent function as that of a magnetic material, so that the magnetic circuit can be stably formed.

It is preferable that an annular dispersion preventing member which prevents the magnetic fluid from being dispersed be disposed radially outward of a portion on which the magnetic fluid being magnetically held.

In doing so, the dispersion of the magnetic fluid to the exterior can be suppressed, even when part of the magnetic fluid is separated from the portion where the magnetic fluid is held against the magnetic attraction force due to a centrifugal force applied to the magnetic fluid.

It is preferable that an annular labyrinth seal forming member to form a labyrinth seal structure axially outside of the portion on which the magnetic fluid being magnetically held is disposed on any of the two members.

In doing so, it is possible to suppress the leak of the magnetic fluid to the exterior, and the entry of foreign debris (dust, etc.) into the interior of the magnetic fluid seal.

Note that the above individual configurations may be employed in combination when possible.

As described above, the present invention is capable of producing the stable sealing performance by stably holding a magnetic fluid in place, even in cases when the two members become eccentric.

BRIEF DESCRIPTION OF DRAWINGS

FIGS. 3A-3G are schematic cross-sectional views illustrating various Modification Examples of a magnetic circuit forming member according to Example 1 of the present invention.

FIG. 7A is a schematic cross-sectional view illustrating a magnetic fluid seal according to Example of the present invention, and FIG. 7B is a view illustrating an inner wall surface of a labyrinth seal forming member.

FIG. 8 is a schematic cross-sectional view illustrating a magnetic fluid seal according to Example 6 of the present invention.

FIGS. 11A-11G are views illustrating various Modification Examples of an annular member.

DETAILED DESCRIPTION OF THE INVENTION

Thereinafter, a mode for carrying out this invention will be described and exemplified in detail on the basis of Examples, with reference to the drawings. However, Examples are not intended to exclusively limit the scope of the present invention to the dimensions, materials, shapes, relative arrangements, etc. of the components described therein, except when specified otherwise.

Example 1

A description will be given of a magnetic fluid seal according to Example 1 of the present invention, with reference to FIGS. 1 to 3G. Note that a magnetic fluid seal 1 according to this Example is applicable to agitators, gas seals for VOC measures, various industrial apparatus such as vacuum devices for manufacturing semiconductors, fishing reels, shaft parts for various devices such as bicycles, as a leak prevention seal or a dust seal.

<Overall Configuration of Magnetic Fluid Seal>

Figure 1:
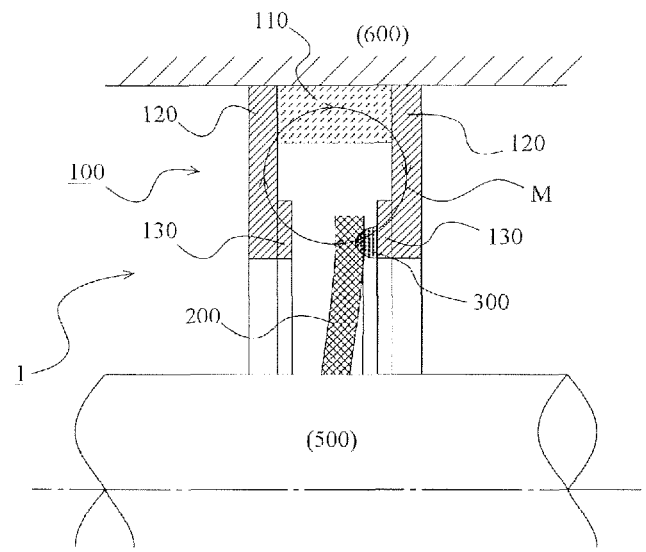
FIG. 1 is a schematic cross-sectional view illustrating a magnetic fluid seal according to Example 1 of the present invention.

A description will be given of an overall configuration of a magnetic fluid seal according to Example 1 of the present invention, in particular, with reference to FIG. 1. FIG. 1 shows a stationary state (when a shaft 500 and a housing 600, or two members, are stationary).

The magnetic fluid seal 1 is provided to seal an annular gap between the shaft 500 and the housing 600 that rotate relative to each other (including not only a case where one rotates and the other is stationary, but also a case where both rotate). In addition, the magnetic fluid seal 1 includes a magnetic circuit forming member 100 attached to the inner circumferential surface of a shaft hole in the housing 600, an annular member 200 attached to the shaft 500, and a magnetic fluid 300.

Moreover, the magnetic circuit forming member 100 according to this Example includes an annular permanent magnet 110 which is fitted into and fixed to the inner circumferential surface of the shaft hole in the housing 600, and a pair of disc-shaped magnetic pole members (pole pieces) 120 with a hole which are provided on the respective sides (N pole side portion and pole side portion) of the permanent magnet 110. In addition, magnetic pole tip members 130 are disposed along the periphery of each of the holes and on the respective opposing sides of the pair of the magnetic pole members 120. Note that both of the magnetic pole members 120 and both of the magnetic pole tip members 130 are composed of magnetic materials.

With the above configuration, a magnetic circuit M is formed, which passes through the permanent magnet 110, the pair of magnetic pole members 120, the pair of magnetic pole tip members 130, and a gap between the pair of magnetic pole tip members 130.

The annular member 200 is a disc-shaped member with a hole, and the inner circumferential surface thereof is fixed to the outer circumferential surface of the shaft 500. This annular member 200 is composed of a flexible material, so that the outer circumferential surface side thereof can sway in the axial direction. As an example of this material, porous silicon, rubber, resin, fabric such as felt, paper or the like, can be given.

At least a portion of the annular member 200 which is in contact with the magnetic fluid 300 and its vicinity are structured to be able to absorb and retain the magnetic fluid 300. Specifically, when porous silicon, fabric, paper, or the like as described above is employed for the material of the annular member 200, the annular member 200 can absorb and retain the magnetic fluid 300 due to the property of the material itself. In addition, even when the material that cannot absorb and retain the magnetic fluid 300 due to the property itself, such as rubber, resin or the like, is used, the annular member 200 can absorb and retain the magnetic fluid 300 due to the capillary action by employing a foamable structure for the portion of the annular member 200 which is in contact with the magnetic fluid 300 and its vicinity.

The annular member 200 is configured such that its radially outward side opposes the magnetic pole tip member 130 of the magnetic circuit forming member 100 in the axial direction. By supplying the magnetic fluid 300 to a space between the respective opposing surfaces of the annular member 200 and the magnetic pole tip member 130, the magnetic fluid 300 can be held in place between the opposing surfaces due to the magnetic attraction force while a part of it is absorbed and retained in the annular member 200. Meanwhile, even when the material of the annular member 200 is not a magnetic material, at least a portion of the annular member 200 which is in contact with the magnetic fluid 300 and its vicinity retain the magnetic fluid 300 as described above, performing a function similar to that of a magnetic material. Consequently, a stable magnetic circuit is formed, and the magnetic fluid 300 is stably held in place.

With the above configuration, a combination of the magnetic circuit forming member 100, the annular member 200, and the magnetic fluid 300 seals the annular gap between the shaft 500 and the housing 600.

<Usage State>

A description will be given of a usage state of the magnetic fluid seal 1 according to Example 1 of the present invention, in particular, with reference to FIG. 2.

In this Example, the shaft 500 and the housing 600 may rotate eccentrically upon relative rotation. FIG. 2 illustrates a case where the housing 600 moves relative to the shaft 500 in a direction of an arrow X due to the eccentricity. In other words, FIG. 2 illustrates a case where the shaft 500 and the housing 600 move relative to each other in the axial direction, and a gap between the shaft 500 and the housing 600 is widened within a cross-sectional area of this figure.

As shown, when the shaft 500 and the housing 600 move relative to each other in this manner, the vicinity of the radially outward side of the annular member 200 sways due to the magnetic attraction force so as to follow the movement of the magnetic pole tip member 130 of the circuit forming member 100. This maintains the state where the magnetic fluid 300 is held in place.

<Advantage of Magnetic Fluid Seal According to this Embodiment>

In the magnetic fluid seal 1 according to this Example, even when the shaft 500 and the housing 600 move relative to each other due to the eccentricity or the like, the magnetic fluid 300 is stably held in place. This feature will be described in more detail.

The magnetic fluid seal 1 according to this Example is configured such that the magnetic fluid 300 is magnetically held between axially opposing surfaces of the annular members 200 and the magnetic pole tip member 130 of the magnetic circuit forming member 100. Therefore, even when the interval of the gap between the shaft 500 and the housing 600 is varied, only a location within the annular member 200 where the magnetic fluid 300 makes contact is varied while a distance between the respective opposing surfaces of the annular member 200 and the magnetic pole tip members 130 isn't.

Moreover, the magnetic fluid seal 1 according to this Example is configured such that a portion of the annular member 200 which faces the magnetic pole tip member 130 sways so as to follow the magnetic pole tip member 130. Accordingly, even when the shaft 500 and the housing 600 move relative to each other in the axial direction, the distance between the respective opposing surfaces of the annular member 200 and the magnetic pole tip member 130 is hardly varied.

As described, even when the interval of the gap between the shaft 500 and the housing 600 is varied, or even when the shaft 500 and the housing 600 move relative to each other in the axial direction, the distance between the respective opposing surfaces of the annular member 200 and the magnetic pole tip member 130 is hardly varied. Thus, the magnetic fluid 300 is stably held in place (magnetically held) within a region defined between the respective opposing surfaces of the annular member 200 and the magnetic pole tip member 130.

In this Example, at least a portion of the annular member 200 which is in contact with the magnetic fluid 300 is configured to be able to absorb and retain the magnetic fluid 300. This ensures that the magnetic fluid 300 is held in place. In addition, even when the amount of the magnetic fluid 300 is decreased due to the dispersion or the like, the magnetic fluid 300 retained in the annular member 200 can be supplied to the region between the respective opposing surfaces of the annular member 200 and the magnetic pole tip member 130. This enables the magnetic fluid 300 to be supplied over an extended period by retaining a large amount of magnetic fluid 300 in the annular member 200, which prolongs the lifetime. Furthermore, even when the material itself of the annular member 200 is a non-magnetic material, the portion of the annular member 200 which retains the magnetic fluid 300 performs a function equivalent to that of a magnetic material, thereby making it possible to form the magnetic circuit M stably.

In this Example, the magnetic circuit is formed through the vicinity of the end of the annular member 200 and a location of the magnetic circuit forming member 100, enabling the magnetic fluid 300 to be held by this magnetic circuit. Therefore, the material of the shaft 500 can be either of a magnetic or non-magnetic material. In addition, even when the interval of the annular gap between the shaft 500 and the housing 600 is wide, a sleeve composed of a magnetic material or the like which has been conventionally provided for forming a magnetic circuit is no longer necessary. Meanwhile, in this Example, an amount of magnetic fluid 300 doesn't need to be increased since it is only necessary for the magnetic fluid 300 to be magnetically held in a small gap between one of the pair of magnetic pole members 120 (magnetic pole tip members 130) and the annular member 200. Furthermore, the distance between the pair of magnetic pole members 120 (magnetic pole tip members 130) may also be long or short as long as the distance therebetween is adequate to form the magnetic circuit M, thereby providing a high degree of flexibility in the design.

Moreover, because the magnetic fluid 300 is present between the annular member 200 and the magnetic pole tip member 130, the friction resistance therebetween can be extremely decreased due to the self-lubricating effect thereof. In addition, by applying a surface processing to the surface of the annular member 200 for reducing the friction resistance thereof, the friction resistance can be further reduced.

<Others>

Figure 2:
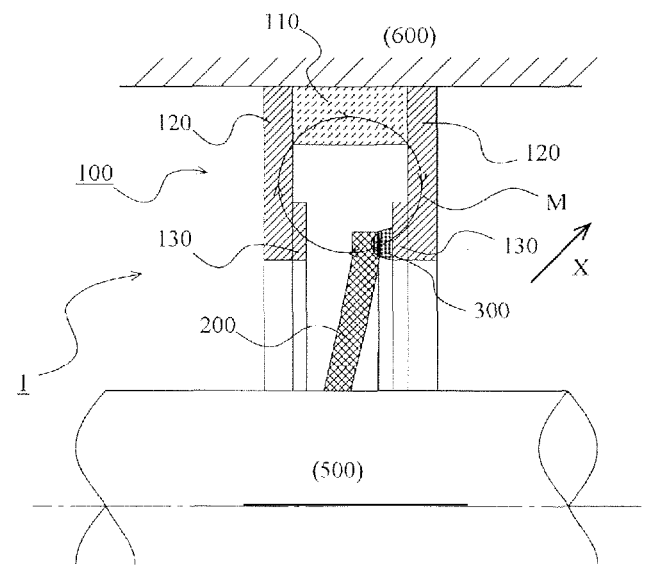
FIG. 2 is a schematic cross-sectional view illustrating the magnetic fluid seal according to Example 1 of the present invention.

In the above description, the case has been exemplified where the magnetic circuit forming member 100 includes the annular permanent magnet 110, the pair of magnetic pole members 120, and the pair of magnetic pole tip members 130 having a rectangular cross-section, as illustrated in FIGS. 1 and 2. However, a magnetic circuit forming member that is applicable to the present invention is not limited to such a configuration. A description will be given of another example of a magnetic circuit forming member that is applicable to the present invention, with reference to FIGS. 3A to 3G. FIGS. 3A to 3G are schematic cross-sectional views illustrating various Modification Examples of a magnetic circuit forming member, and illustrates the cross-section of only the main parts. Note that in FIGS. 3C to 3G, a permanent magnet is omitted from the magnetic circuit forming member, and only one of a pair of magnetic pole members is illustrated.

FIG. 3A illustrates one exemplified case where a magnetic circuit forming member is configured with magnets alone. Specifically, a pair of disc-shaped permanent magnets 111 each with a hole is provided on the inner circumferential surface of the shaft hole in the housing 600. In between the pair of permanent magnets 111, one has an N pole on the inner circumferential side and an S pole on the outer circumferential side, while the other has an S pole on the inner circumferential side and an N pole on the outer circumferential side. This forms a magnetic circuit M as illustrated in the figure, making it possible to magnetically hold the magnetic fluid 300 to one end of the permanent magnet 111.

FIG. 3B illustrates a case based on the configuration illustrated in FIG. 3A where annular magnetic pole tip members 130 are provided on the respective opposing surfaces of the pair of permanent magnets 111 and along the respective circumferences of the holes. This enables the magnetic fluid 300 to be concentrated only on the surface side that opposes the annular member 200 (not illustrated in FIGS. 3A to 3G).

FIG. 3C illustrates a case where the magnetic pole tip members 130 are not provided in the configuration illustrated in FIGS. 1 and 2. In this case, the magnetic fluid 300 that is magnetically held on the end of the magnetic pole member 120 comes around not only to the side opposing the annular member 200 (not illustrated in FIGS. 3A to 3G) but also to the opposite side, but the holding function for the magnetic fluid 300 is not affected so much.

FIG. 3D illustrates a case where a cross-sectional shape of a magnetic pole tip member 131 is triangular. Moreover, FIG. 3E illustrates a case where a cross-sectional shape of a magnetic pole tip member 132 is semielliptical. By employing these configurations, a location where the magnetic fluid 300 is held can be concentrated within a smaller region.

FIG. 3F illustrates a case where magnetic pole tip members 133 each of which has a triangular cross-section are provided at two locations while being adjacent to each other, and FIG.

3G illustrates a case where a plurality of grooves 121a each with a triangular cross-section are formed on the side of the magnetic pole member 121 that opposes the annular member 200 (not illustrated in FIGS. 3A to 3G) and in the vicinity of an end of the magnetic pole member 121. When these configurations are employed, it is possible to suppress the movement of a location where the magnetic fluid 300 is held, with respect to magnetic pole tip members 133 or the magnetic pole member 121, thereby holding the magnetic fluid 300 in place more stably.

Although the above description has exemplified the case where the cross-sectional shape of the annular member 200 is rectangular as illustrated in FIG. 1 or 2, a shape of an annular member that is applicable to the present invention is not limited thereto. For example, any appropriate cross-sectional shape, such as a triangular shape, or one having an arc-shaped end or an ellipse-shaped end may be employed. Furthermore, although the above various examples have exemplified the case where the magnetic pole member and the magnetic pole tip member are separate members, a single member that integrates them may be employed.

Example 2

FIGS. 4A to 4D illustrate Example 2 according to the present invention. This Example will describe a configuration where an annular dispersion preventing member is provided to prevent a magnetic fluid from being dispersed, in addition to the above configuration exemplified in Example 1. The same reference numerals are assigned to the same components as those of Example 1, and descriptions therefor will be omitted as appropriate. Note that FIGS. 4A to 4D illustrate schematic cross-sectional views of a magnetic fluid seal, and only a cut surface obtained by cutting the main part is illustrated.

This Example exemplifies a case where an annular dispersion preventing member that prevents a magnetic fluid 300 from being dispersed is disposed radially outward of a portion on which the magnetic fluid 300 is magnetically held.

Figure 4A:
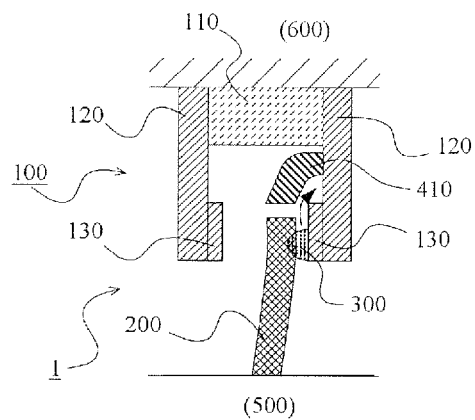
FIGS. 4A-4D are schematic cross-sectional views illustrating a magnetic fluid seal according to Example 2 of the present invention.

In an example illustrated in FIG. 4A, an annular dispersion preventing member 410 is disposed on the magnetic pole member 120. This dispersion preventing member 410 is configured such that one end thereof is fixed to the magnetic pole member 120 and the other end (free end) thereof extends toward the end of an annular member 200. This achieves the configuration where the dispersion preventing member 410 covers the radially outward side of a portion where the magnetic fluid 300 is magnetically held.

With the above configuration, the dispersion preventing member 410 can suppress the dispersion of the magnetic fluid to the exterior of a magnetic fluid seal 1, even when a centrifugal force is applied to the magnetic fluid 300 along with the relative rotation of the shaft 500 and the housing 600, and part of the magnetic fluid 300 is separated radially outwardly against the magnetic attraction force from the portion where the magnetic fluid 300 is held. Note that the magnetic fluid that has been separated from the portion is kept adhered around the dispersion preventing member 410 while undergoing the centrifugal force, but can be returned to the initial location due to the magnetic attraction force, once the centrifugal force is not applied.

Figure 4B:
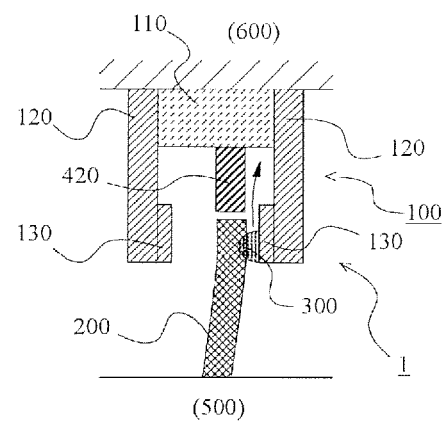
Figure 4C:
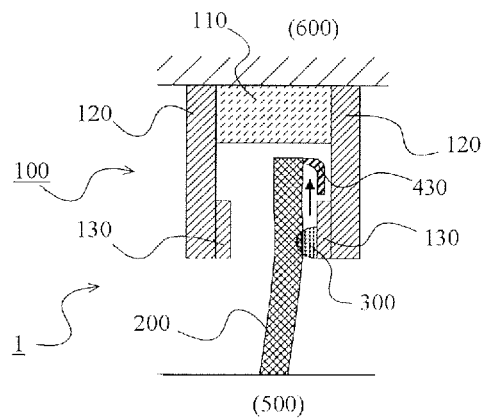

An example illustrated in FIG. 4B illustrates a case where an annular dispersion preventing member 420 is disposed on a permanent magnet 110, and an example illustrated in FIG. 4C illustrates a case where an annular dispersion preventing member 430 is disposed on the annular member 200. Either case can produce a functional effect similar to that of the above case.

Note that each of the arrows in FIGS. 4A to 4C indicates a direction in which part of the magnetic fluid separates from the magnetic attraction portion due to the centrifugal force.

It is desirable for the above dispersion preventing members 410, 420 and 430 to be composed of a non-magnetic material, so that the magnetic fluid adhered to each dispersion preventing member is not magnetically attracted thereto.

Figure 4D:
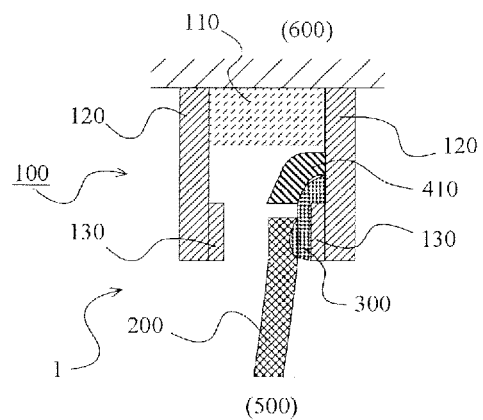

When the configuration with the above dispersion preventing member 410, 420 or 430 being disposed is employed, such configuration that the magnetic fluid 300 is filled into a spatial region defined by the dispersion preventing member 410, 420 or 430, the annular member, the magnetic pole members, and the like can also be employed. Employing such a configuration increases the amount of the magnetic fluid 300 to be reserved, thereby making it possible to prolong the lifetime of the magnetic fluid seal 1. Note that FIG. 4D illustrates a case where a magnetic fluid is filled into the above spatial region in the example illustrated in FIG. 4A.

Example 3

Figure 5:
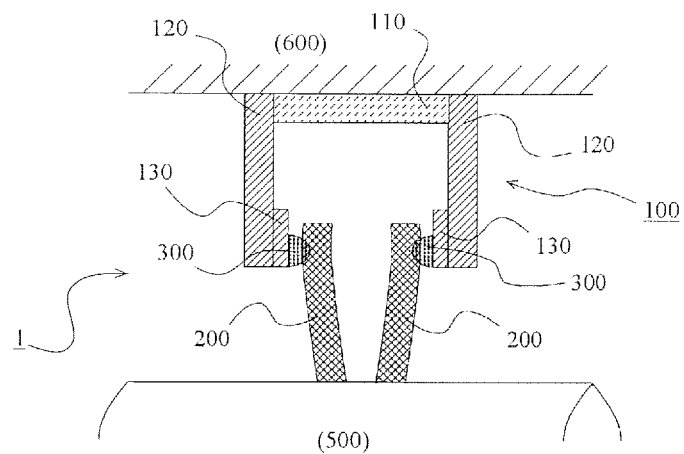
FIG. 5 is a schematic cross-sectional view illustrating a magnetic fluid seal according to Example 3 of the present invention.

FIG. 5 illustrates Example 3 of the present invention. Example 1 described above has exemplified the configuration where the single annular member holds the magnetic fluid at a single location, whereas this Example has exemplified a configuration where two annular members hold a magnetic fluid at two locations. The same reference numerals are assigned to the same components as those of Example 1, and descriptions therefor will be omitted as appropriate. FIG. 5 illustrates a schematic cross-sectional view of a magnetic fluid seal, and only a cut surface obtained by cutting the main part.

As illustrated in FIG. 5, a configuration of a magnetic circuit forming member 100 is the same as that of Example 1. In this Example, two annular members 200 are disposed on a shaft 500. The configuration itself of each annular member 200 is the same as that of Example 1 described above.

Respective configurations of magnetically holding a magnetic fluid 300 are employed between one of the pair of annular members 200 and one of a pair of magnetic pole tip members 130 and between the other of the pair of annular members 200 and the other of the pair of magnetic pole tip members 130.

According to this Example, the annular gap between the shaft 500 and a housing 600 can be sealed at two locations.

Example 4

Figure 6:
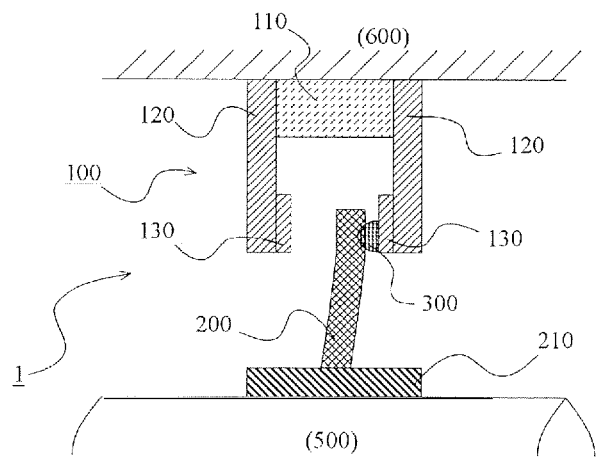
FIG. 6 is a schematic cross-sectional view illustrating a magnetic fluid seal according to Example 4 of the present invention.

FIG. 6 illustrates Example 4 of the present invention. Example 1 described above has exemplified the case where the annular member is fixed to the shaft directly, whereas this Example exemplifies a configuration where an annular member is disposed on a sleeve fitted onto the shaft. The same reference numerals are assigned to the same components as those of Example 1, and descriptions therefor will be omitted as appropriate. FIG. 6 illustrates a schematic cross-sectional view of a magnetic fluid seal, and only a cut surface obtained by cutting the main part.

In this Example, a sleeve 210 fitted onto the shaft 500 is disposed. In addition, an annular member 200 is fixed to this sleeve 210. Rest of the configuration thereof is the same as that of Example 1 described above.

It is effective to dispose the annular member 200 on the sleeve 210 as in this Example, in the case where the annular member 200 cannot be fixed to the shaft 500 for some technical reasons or in view of some circumstances, or the case where annular member 200 is expendable and needs to be exchanged as appropriate. In this Example, thus, the sleeve 210 with the annular member 200 disposed thereon can be handled as a single component.

Example 5

FIGS. 7A and 7B illustrate Example 5 of the present invention. In this Example, a description will be given of a configuration where a labyrinth seal structure is formed, in addition to the above configuration exemplified in Example 1. The same reference numerals are assigned to the same components as those of Example 1, and descriptions therefor will be omitted as appropriate. FIG. 7A illustrates schematic cross-sectional views of a magnetic fluid seal, and only a cut surface obtained by cutting the main part.

As illustrated in FIG. 7A, in this Example, an annular labyrinth seal forming member 450 that forms a labyrinth seal structure is disposed on the shaft 500 axially outside of a portion where a magnetic fluid 300 is magnetically held. This labyrinth seal forming member 450 is a disc-shaped member with a hole (a hole having a same diameter as the outer diameter of the shaft 500), and the inner circumferential surface thereof is fixed to the outer circumferential surface of the shaft 500. A small gap is formed between the labyrinth seal forming member 450 and the magnetic pole member 120, and this small gap forms a labyrinth structure. This can suppress the partial leak of the magnetic fluid to the exterior, or the entry of foreign debris (dust, etc.) into the interior. In addition, it is more effective to provide projections or grooves on the inner wall side of the labyrinth seal forming member 450 for producing a pump effect, in case the shaft 500 rotates. FIG. 7B illustrates one example thereof. In this figure, reference numerals 450a, 450b and 450c are projections for producing a pump effect.

Note that it is desirable that the rotational direction of the labyrinth seal forming member 450 and the shape of projections or grooves be combined to produce a pumping effect in the radially outward direction. This makes it possible to enhance the prevention of the entry of foreign debris from the exterior. Even in this case, it is possible to sufficiently suppress the partial leak of the magnetic fluid to the exterior, due to the effect of the above labyrinth seal and the disposition of the projections or grooves.

Example 6

FIG. 8 illustrates Example 6 of the present invention. Examples described above have exemplified the configurations where the magnetic circuit forming member is disposed on the housing, and the annular member is disposed on the shaft, whereas this Example exemplifies a configuration where the magnetic circuit forming member is disposed on the shaft, and the annular member is disposed on the housing. The same reference numerals are assigned to the same components as those of Example 1, and descriptions therefor will be omitted as appropriate. FIG. 8 illustrates a schematic cross-sectional view of a magnetic fluid seal, and only a cut surface obtained by cutting the main part.

In this Example, a magnetic circuit forming member 100 is disposed on a shaft 500, and an annular member 200 is disposed on a housing 600. The magnetic circuit forming member 100 and the annular member 200 basically have the same configurations as those having been described in Example 1 above, except that each employs a radially-symmetrical shape to that of Example 1, as the inner circumferential surface side being in a radially symmetric-fashion to the outer circumferential surface side. Needless to say, even this Example produces a functional effect similar to that of Example 1 described above.

<Others>

Among the various configurations of the magnetic circuit forming member illustrated in FIGS. 3A to 3G which have been exemplified in Example 1 described above, the various configurations of the dispersion preventing member which have been exemplified in Example 2, the configuration provided with the two annular members which has been exemplified in Example 3, the configuration provided with the sleeve which has been exemplified in Example 4, and the configuration provided with the labyrinth seal forming member which has been exemplified in Example 5, any given combination is possible.

As for the configuration exemplified in Example 6, the each configuration having been exemplified in Examples 1 to 5 may be applied thereto arbitrarily. However, when the each configuration exemplified in Examples 1 to 5 is applied to the configuration exemplified in Example 6, each employs a radially-symmetrical shape to that of the original, as the inner circumferential surface side being in a radially symmetric-fashion to the outer circumferential surface side. Note that when the dispersion preventing member exemplified in Example 2 is applied to the configuration exemplified in Example 6, the dispersion preventing member is disposed on the inner circumferential surface of the shaft hole in the housing 600 or on the annular member 200.

In the case where a target to be sealed is a liquid, surface processing may be performed as appropriate, in order to prevent the liquid from being absorbed in the interfaces of the various members.

Example 7

Figure 9A:
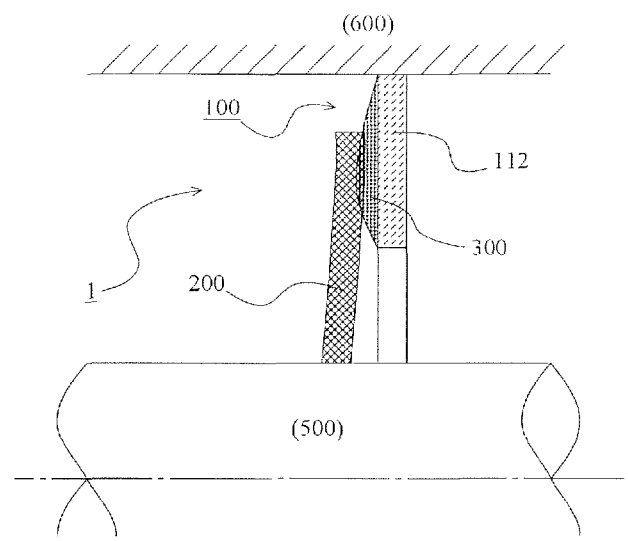
FIGS. 9A-9C are schematic cross-sectional views illustrating a magnetic fluid seal according to Example 7 of the present invention.
Figures 9B, 9C:
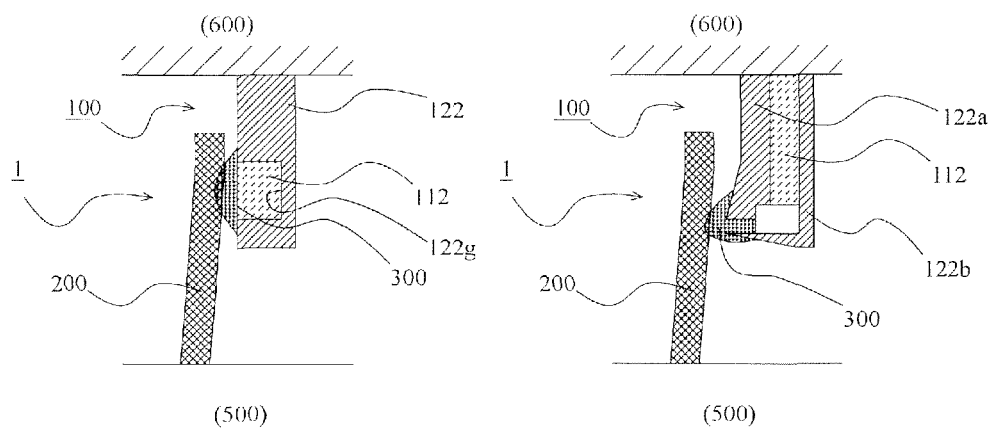

FIGS. 9A to 9C illustrate Example 7 of the present invention. Examples described above have exemplified the configurations where the magnetic pole members or the magnets are arranged on the respective sides of the annular member in the axial direction, whereas this Example exemplifies a configuration where a magnet or the like is disposed on only one side of the annular member in the axial direction. The same reference numerals are assigned to the same components as those of Example 1, and descriptions therefor will be omitted as appropriate. FIGS. 9A to 9C illustrate schematic cross-sectional views of a magnetic fluid seal, and only a cut surface obtained by cutting the main part. In addition, FIGS. 9A to 9C illustrate various Modification Examples.

FIG. 9A illustrates a configuration where a magnetic circuit forming member 100 is composed of a single permanent magnet 112 alone. In this Example, specifically, the outer circumferential surface of the annular permanent magnet 112 is fixed to the inner circumferential surface of the shaft hole in a housing 600. Note that one surface of the permanent magnet 112 in the axial direction has an N pole, and the other surface thereof has an S pole. The configuration of the annular member 200 is the same as that of Example 1 described above. Thus, a magnetic fluid seal 1 is configured by holding the magnetic fluid 300 in place between the respective opposing surfaces of the permanent magnet 112 and the annular member 200.

As described above, the structure of this Example is simpler than that of Example 1, and enables the number of the components to be reduced and an assembly operation to be carried out easily.

FIG. 9B is Modification Example of the magnetic fluid seal 1 illustrated in FIG. 9A. In this example, a magnetic circuit forming member 100 includes a permanent magnet 112 and a retention member 122, made of a magnetic material, which retains the permanent magnet 112. In more detail, an annular groove 122g is provided on the disc-shaped retention member 122 with a hole, and the annular permanent magnet 112 is fitted into and retained by this annular groove 122g. Note that one surface of the permanent magnet 112 in the axial direction has an N pole, whereas the other surface thereof has an S pole. This example has a slightly more complicated structure than the magnetic fluid seal 1 illustrated in FIG. 9A, but can narrow a region where the magnetic fluid 300 is held, thereby decreasing the amount of the magnetic fluid 300.

FIG. 9C is Modification Example of the magnetic fluid seal 1 illustrated in FIG. 9A. In this example, a magnetic circuit forming member 100 includes a permanent magnet 112, and a pair of magnetic pole members 122a and 122b provided on the respective ends of this permanent magnet 112 in the axial direction. Note that one surface of the permanent magnet 112 in the axial direction has an N pole, whereas the other surface thereof has an S pole. In addition, a small gap is formed between the respective inner circumferential end sides of the pair of magnetic pole members 122a and 122b, so that the magnetic fluid 300 can be retained in this small gap. This example has a slightly more complicated structure than the magnetic fluid seal 1 illustrated in FIG. 9A, but can narrow a region where the magnetic fluid 300 is held, thereby decreasing the amount of the magnetic fluid 300.

In this Example, it is desirable that the housing 600 to which the permanent magnet 112, the retention member 122, and the magnetic pole members 122a and 122b are fixed be made of a non-magnetic material, so as to cause a magnetic force to concentrate, as much as possible, on a portion where the magnetic fluid 300 is held. In the case where the housing 600 itself is made of a magnetic material, an annular sleeve made of a non-magnetic material may be disposed across the inner circumference of the shaft hole in the housing 600, and the permanent magnet 112 and the like may be fixed to the inner circumference of the sleeve.

The various configurations of the dispersion preventing member which have been exemplified in Example 2 or the configuration provided with the labyrinth seal forming member which has been exemplified in Example 5 can also be employed for this Example as appropriate. Furthermore, the configuration where the magnetic circuit forming member 100 is disposed on the shaft 500 and the annular member 200 is disposed on the housing 600 can also be employed for this Example, as described in Example 6. In this case, it is desirable for the shaft 500 to be made of a non-magnetic material.

<Various examples of Magnet>

Although a single annular permanent magnet that has one surface of an N pole and the other surface of an S pole in the axial direction can be employed as the permanent magnet used in Examples described above, a permanent magnet that can be employed for each Example is not limited thereto. Here, a description will be given of one example of a magnet that can be employed for each Example, with reference to FIGS. 10A to 10F.

Figure 10A:
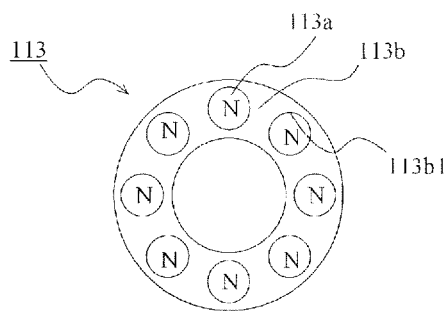
FIGS. 10A-10F are views illustrating various Modification Examples of a magnet.

A magnet 113 illustrated in FIG. 10A includes a plurality of disc-shaped permanent magnets 113a, and a retention member 113b, made of a non-magnetic material, which retains the plurality of permanent magnets 113a. Note that the retention member 113b is a disc-shaped member with a hole, and is provided with a plurality of circular holes 113b1 for retaining the permanent magnets 113a. The permanent magnets 113a are fitted into and retained by the plurality of holes 113b1. Note that the disc-shaped permanent magnets 113a each have one surface of an N pole and the other surface of an S pole, and are retained by the retention member 113b in such a way the same poles are oriented to the same surface side. However, a configuration where the N and S poles are combined to be arranged alternately on one surface side may be employed.

Figure 10B:
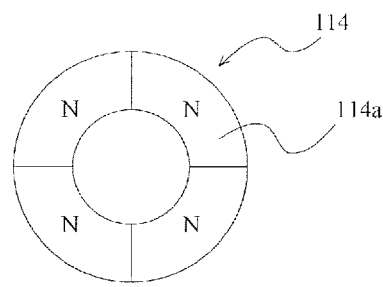

A magnet 114 illustrated in FIG. 10B constitutes an annular magnet as a whole by combining sector-shaped permanent magnets 114a. The sector-shaped permanent magnets 114a each have one surface of an N pole and the other surface of an S pole, and are combined in such a way the same poles are oriented to the same surface side. However, a configuration where the N and S poles are combined to be arranged alternately on one surface side may be employed.

Figure 10C:
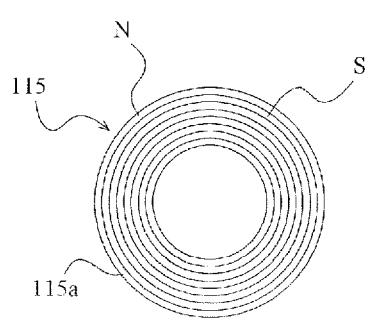
Figure 10D:
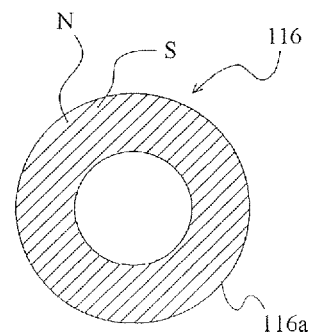

A magnet 115 illustrated in FIG. 10C is a combination of a plurality of annular permanent magnets 115a, each of which has one surface of an N pole and the other surface of an S pole and which are combined in such a way the N and S poles thereof are arranged alternately on one surface side in a concentric fashion.

A magnet 116 illustrated in FIG. 100D has an overall constitution of an annular magnet which is formed by combining a plurality of substantially rod-shaped permanent magnets 116a, each of which has one surface of an N pole and the other surface of an S pole, in such a way the N and S poles are arranged alternately on one surface side.

Figure 10E:
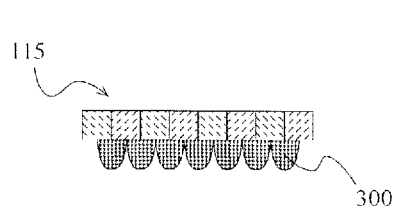

FIG. 10E is a cross-sectional view of the magnet 115 illustrated in FIG. 10C, and illustrates a state where the magnetic fluid 300 is held.

Figure 10F:
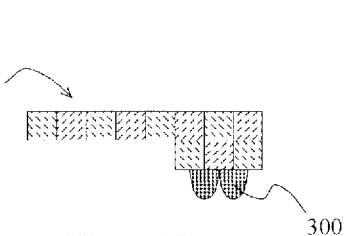

The magnet 118 illustrated in FIG. 10F is Modification Example of the magnet 118 illustrated in FIGS. 10C and 10E, and is an example of partially employing a bilayer structure. Thus, the bilayer structure is partially employed only for the portion which holds the magnetic fluid 300 in place, thereby being able to narrow a region where the magnetic fluid 300 is held.

<Various Examples of Ring-Shaped Member>

The annular member for use in each Example described above may be merely a disc-shaped member with a hole which has a flexibility so as to sway in the axial direction. Accordingly, for example, a member that has a one-layer structure made of a single non-magnetic material can be employed, but an annular member which can be employed for each Example is not limited to such an annular member. Here, a description will be given of one example of an annular member that can be employed for each Example, with reference to FIGS. 11A to 13D.

It is desirable for the annular member to be composed of a magnetic material, since the annular member constitutes a part of the magnetic circuit. However, the annular member requires flexibility as described above, and no single material having both magnetization and flexibility is found. Accordingly, a configuration can be employed, where a flexible material, such as porous silicon, rubber, resin, fabric such as felt, paper or the like, contains magnetic units, such as fillers, wires or the like, in order to provide both magnetization and flexibility. FIGS. 11A to 11G illustrate such one example.

FIGS. 11A-11G illustrate various examples of an annular member in which a disc-shaped member with a hole is used as a base material, and magnetic units are arranged in the inside of the base material. Note that this base material is composed of a flexible non-magnetic material. FIG. 11A illustrates an annular member 211 in which a plurality of rod-shaped magnetic units N are arranged in the inside of the base material so as to be along the circumferential direction. FIG. 11B illustrates an annular member 212 in which a plurality of disc-shaped magnetic units N are arranged in the inside of the base material so as to be along the circumferential direction. FIG. 11C illustrates an annular member 213 in which a plurality of rod-shaped magnetic units N are arranged radially in the inside of the base material. FIG. 11D illustrates an annular member 214 in which a plurality of annular magnetic units N are arranged concentrically in the inside of the base material. FIG. 11E illustrates an annular member 215 in which regions where a magnetic unit N is disposed and regions where a magnetic unit N is not disposed are arrayed in the inside of the base material in a lattice form. FIG. 11F is a view illustrating an XX cross-section in FIG. 11C. In the annular members illustrated in FIGS. 11A to 11F, a method of arranging the magnetic units N in the inside of the base material is not limited to a specific one. For example, in the case where the base material is a fabric, the magnetic units N can be arranged in the inside of the base material by inweaving the magnetic units N. FIG. 11G illustrates an annular member 216 in which powdery magnetic units N are arranged in the inside of the base material while being distributed therein by mixing the powdery magnetic units N into the base material.

As described above, these annular members have both magnetization and flexibility. An annular member having magnetization improves the magnetic property, which can increase the holding force for a magnetic fluid, thereby enhancing the sealing property. Note that it is possible to adjust the balance between the magnetization and the flexibility by adjusting the amount or arrangement of the magnetic units. The size of each magnetic unit N is not limited to a specific one, but it is desirable that it be larger than a magnetic particle in the magnetic fluid 300.

Figure 12A:
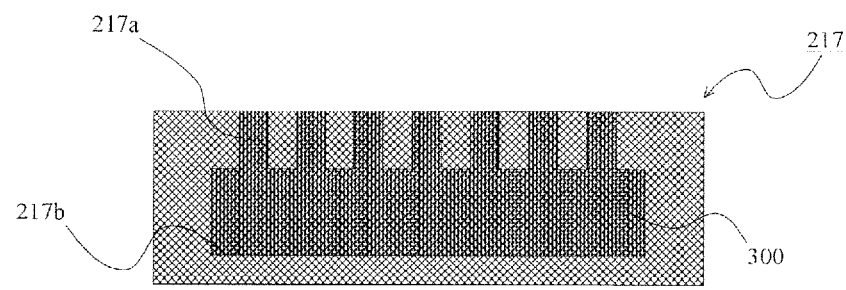
FIGS. 12A-12C are views illustrating various Modification Examples of the annular member.

Next, a description will be given of an annular member that can increase the amount of the magnetic fluid to be held, with reference to FIGS. 12A to 12C. An annular member 217 illustrated in FIG. 12A includes capillary portions 217a that cause the capillary action, and a hollow portion 217b that is connected to the capillary portions 217a. Note that the annular member 217 is composed of a material (rubber or resin) that cannot absorb and retain the magnetic fluid 300. In the annular member 217 configured above, the magnetic fluid 300 can be supplied between the annular member 217 and the magnetic pole member, etc. over an extended period by reserving the magnetic fluid 300 in the hollow portion 217b. This enables the lifetime to be prolonged.

Figure 12B:
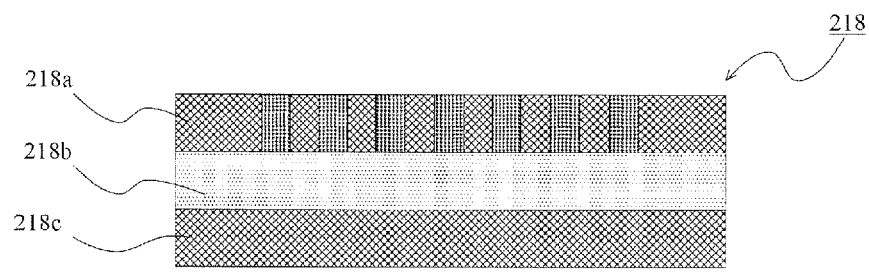

A annular member 218 illustrated in FIG. 12B has a multilayered structure including a first layer 218a that is provided with capillary portions for causing the capillary action, a second layer 218b that can absorb and retain a magnetic fluid due to a property of its own material, and a third layer 218c. Note that the first layer 218a and the third layer 218c are composed of a material that cannot absorb and retain the magnetic fluid 300. In the annular member 218 configured above, the magnetic fluid 300 can be supplied between the annular member 218 and the magnetic pole member, etc. over an extended period by reserving the magnetic fluid 300 in the second layer 218b. This enables the lifetime to be prolonged.

Figure 12C:
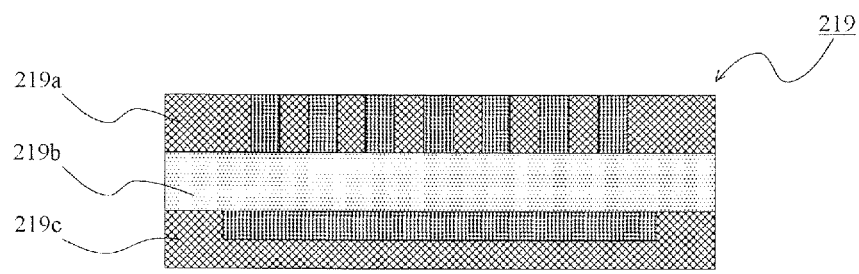

An annular member 219 illustrated in FIG. 12C has a multilayered structure including a first layer 219a that is provided with capillary portions for causing the capillary action, a second layer 219b that can absorb and retain a magnetic fluid due to a property of its own material, and a third layer 219c that is provided with a hollow portion. Note that the first layer 219a and the third layer 219c are composed of a material that cannot absorb and retain the magnetic fluid 300. In the annular member 219 configured above, a magnetic fluid 300 can be supplied between the annular member 219 and the magnetic pole member, etc. over an extended period by reserving the magnetic fluid 300 in the second layer 218b as well as reserving the magnetic fluid 300 in the hollow portion of the third layer 219c. This enables the lifetime to be prolonged.

Note that as for the location where the capillary portions are provided in the annular member 217, 218 or 219, figures illustrate the case where they are provided entirely. However, it may be only at a location where the magnetic fluid 300 is held between the magnetic pole members, etc. In addition, it is possible to adjust the flexibility of the annular member by adjusting the arrangement or size of the hollow portion or by adjusting the thickness of each layer when the layered structure is employed.

Figure 13A:
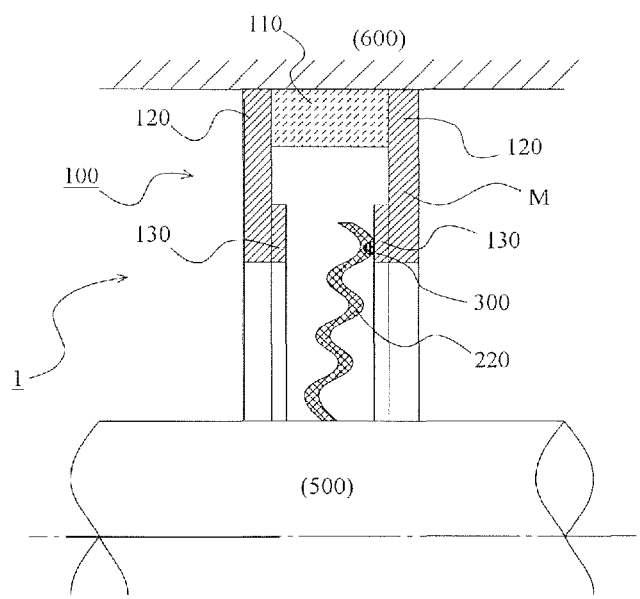
FIGS. 13A-13D are views illustrating Modification Example of the annular member.

Next, with reference to FIG. 13A to 13D, a description will be given of an annular member that enables the magnetic fluid 300 to be stably held in place even under the situation where the shaft 500 and the housing 600 move relatively over a long distance in the axial direction. The magnetic fluid seal 1 illustrated in FIG. 13A gives an example in which only a configuration of an annular member 220 is changed in the configuration exemplified in Example 1 described above. Specifically, the annular member 200 of Example 1 described above is a disc-shaped (flat-shaped) member with a hole. Meanwhile, the annular member 220 of this Modification Example is different from the annular member 200 of Example 1 described above in that it is configured, not in a flat shape, but in an accordion shape.

Figures 13B, 13C, 13D:
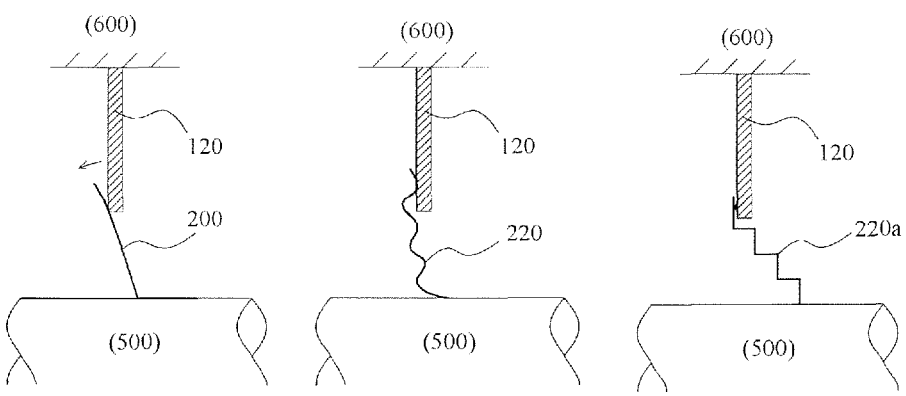

In the case where the annular member 200 has a flat-shape, when a fixed end of the annular member 200 moves as far as the opposite side of a surface of the magnetic pole member 120 where the magnetic fluid 300 is held, due to the movement of the shaft 500 relative to the housing 600 in the axial direction, there is a possibility of the outer circumferential end of the annular member 200 moving in a direction away from the magnetic pole member 120 (see FIG. 13B). This makes it difficult to stably hold the magnetic fluid 300 in place.

Meanwhile, in the case where the annular member 220 has an accordion shape, the outer circumferential side thereof can be flexibly deformed about the inner circumferential side thereof in the axial direction. Therefore, even when the fixed end of the annular member 220 moves in the above manner, a positional relationship of the outer circumferential end of the annular member 220 relative to the magnetic pole member 120 (magnetic pole tip member 130) is hardly changed (see FIG. 13C) This enables the magnetic fluid to be stably held in place. In addition, because the annular member 220 can be expanded and contracted readily in the radial direction by configuring the annular member 220 in an accordion shape, the magnetic fluid can be stably held in place, even upon the great eccentricity. In this case, even when the outer circumferential end of the annular member 220 touches the inner circumferential surface of the permanent magnet 110, the magnetic fluid 300 can be stably held in place since it can be deformed as to be contracted. Furthermore, when being configured in an accordion shape, the annular member 220 can also hold the magnetic fluid at multiple locations, thus further enhancing the sealing performance.

As for an annular member, even when an annular member 220a that is configured, not in an accordion shape, but in a multi-stepped shape when viewing a cross-section thereof, for example, as illustrated in FIG. 13D is employed, a similar functional effect can be produced. In this case, in an initial state, the inner circumferential side of the annular member 220a may be fixed to the outer side of the magnetic pole member 120, etc. or the inner side thereof.

REFERENCE SIGNS LIST 1 magnetic fluid seal
100 magnetic circuit forming member
110, 111, 112, 113a, 114a, 115a, 116a and 117a permanent magnet
113, 114, 115, 116, 117 and 118 magnet
120, 121, 122a and 122b magnetic pole member
121a groove
122 retention member
122g annular groove
130, 131, 132 and 133 magnetic pole tip member
200 annular member
210 sleeve
211, 212, 213, 214, 215, 216, 217, 218 and 219 annular member
217a capillary portion
217b hollow portion
218a first layer
218b second layer
218c third layer
219a first layer
219b second layer
219c third layer
220 and 220a annular member
300 magnetic fluid
410, 420 and 430 dispersion preventing member
450 labyrinth seal forming member
500 shaft
600 housing
M magnetic circuit
N magnetic unit

The invention claimed is:

1. A magnetic fluid seal to seal an annular gap between two members rotating relative to each other, comprising:
   an annular member that is disposed on one of the two members, the annular member comprising a non-magnetic material having a porous structure and having a surface that faces in an axial direction;
   a magnetic fluid that is absorbed and retained in the porous structure; and
   a magnetic circuit forming structure having at least one annular magnetic pole member that forms a magnetic circuit that is disposed on the other of the two members, the at least one magnetic pole member having a surface that opposes the surface of the annular member in the axial direction;
   the annular member further comprising a flexible material adapted to sway and follow the at least one magnetic pole member due to a magnetic attraction force of the magnetic circuit applied to the magnetic fluid retained in the porous structure during both stationary and rotating states of the two members,
   wherein in the magnetic circuit the magnetic fluid is held in place only in a gap between the porous structure and the surface of the at least one magnetic pole member.

2. The magnetic fluid seal according to claim 1,
   wherein an annular dispersion preventing member to prevent the magnetic fluid from being dispersed is disposed radially outward of a portion on which the magnetic fluid being magnetically held.

3. The magnetic fluid seal according to claim 1,
   wherein an annular labyrinth seal forming member adapted to form a labyrinth seal structure axially outside of a portion on which the magnetic fluid being magnetically held is disposed on any of the two members.

4. The magnetic fluid seal according to claim 2,
   wherein an annular labyrinth seal forming member adapted to form a labyrinth seal structure axially outside of the portion on which the magnetic fluid being magnetically held is disposed on any of the two members.

5. The magnetic fluid seal according to claim 1, wherein the porous structure is non-metallic.

6. The magnetic fluid seal according to claim 5, wherein the porous structure comprises one of a silicone, a rubber, a resin, a fabric, a felt and a paper.

7. The magnetic fluid seal according to claim 5, wherein the porous structure comprises one of a foamable rubber and a foamable resin.

8. The magnetic fluid seal according to claim 1,
   wherein the magnetic circuit forming structure has two magnetic pole members that are magnetic members and a permanent magnet therebetween.

9. The magnetic fluid seal according to claim 8,
   wherein the magnetic fluid seal further comprises:
   a second annular member that is disposed on the one of the two members, the second annular member comprising a non-magnetic material and having a porous structure and a surface that faces in an axial direction opposite to the direction of the surface of the annular member that is a first annular member; and
   a magnetic fluid that is absorbed and retained in the porous structure of the second annular member,
   a second magnetic pole member of the two magnetic pole members having a surface that opposes the surface of the second annular member,
   the second annular member further comprising a flexible material adapted to sway and follow the second magnetic pole member due to a magnetic attraction force of the magnetic circuit applied to the magnetic fluid retained in the porous structure of the second annular member during both stationary and rotating states of the two members,
   wherein in the magnetic circuit the magnetic fluid is held in place only in a gap between the porous structure of the second annular member and the surface of the second magnetic pole member.

10. The magnetic fluid seal according to claim 1,
    wherein the magnetic circuit forming structure has two magnetic pole members that are permanent magnets.

11. The magnetic fluid seal according to claim 1,
    wherein the magnetic circuit forming structure has one magnetic pole member that is a permanent magnet.

12. The magnetic fluid seal according to claim 1,
    wherein the magnetic circuit forming structure has one magnetic pole member that has a permanent magnet and a magnetic member.

13. The magnetic fluid seal according to claim 1,
    wherein the annular member further comprises a plurality of magnetic units arranged inside of the annular member.

14. The magnetic fluid seal according to claim 9,
    wherein the second annular member further comprises a plurality of magnetic units arranged inside of the second annular member.

* * * * *